United States Patent [19]

Brandt

[11] Patent Number: 4,942,670

[45] Date of Patent: Jul. 24, 1990

[54] ADHESIVE TEMPLATE TAPE

[76] Inventor: Harold Brandt, 925 Dogwood Cir., Waynesboro, Va. 22980

[21] Appl. No.: 382,266

[22] Filed: Jul. 20, 1989

[51] Int. Cl.$^5$ .............................................. G01B 3/10
[52] U.S. Cl. ........................................ 33/494; 33/759
[58] Field of Search ................ 33/758, 759, 487, 494, 33/755

[56] References Cited

U.S. PATENT DOCUMENTS

| | | | |
|---|---|---|---|
| D. 259,706 | 6/1981 | Smith . | |
| D. 260,738 | 9/1981 | Smith . | |
| 2,187,087 | 1/1940 | Leary | 33/758 |
| 2,778,118 | 6/1957 | Manville . | |
| 2,904,891 | 9/1959 | Cook | 33/494 |
| 3,170,421 | 3/1963 | Jones . | |
| 3,210,850 | 10/1965 | Grzyb | 33/759 |
| 3,621,579 | 11/1967 | Dubitsky . | |
| 3,648,835 | 3/1972 | Yucel | 206/59 C |
| 3,685,155 | 8/1972 | Oblander | 33/755 |
| 4,217,379 | 8/1980 | Salvador | 33/758 |
| 4,301,596 | 11/1981 | Sedlock | 33/494 |
| 4,351,113 | 9/1982 | Eggertsen . | |
| 4,845,858 | 7/1989 | Thomas | 33/494 |

FOREIGN PATENT DOCUMENTS 3529958  8/1985  Fed. Rep. of Germany .

Primary Examiner—Thomas B. Will

[57] ABSTRACT

An adhesive template tape for aligning of building construction members, particularly for establishing of locations and spacing for equispaced construction members such as, for instance, studs in wall framing construction; the adhesive template tape including longitudinally equidistantly spaced, visually contrasting fields corresponding to standardized spacings and thickness sizes of building construction members. In use, the adhesive template tape is adhesively affixed to and along construction members, and other construction members are aligned with the visually contrasting fields on the tape and fastened thereover.

27 Claims, 1 Drawing Sheet

4,942,670

ADHESIVE TEMPLATE TAPE

BACKGROUND OF THE INVENTION

1. Field of the Invention

This invention relates to templates for use in building construction to facilitate locating and spacing of construction members that are erected at repetitive spacing; for instance for establishing locations and spacing of wall studding along sill plates.

2. Prior Art and Other Considerations

Customarily, standardized sizes for building construction members and standardized spacings of such members are utilized in costruction of buildings. For example, standardized lumber sizes and relative spacings are employed in frame construction, as is well known in the art. Various measuring devices, such as tape measures, rulers, etc. have been employed to measure, lay out, and mark upon construction members locations for fastening of other members thereto.

Such layout procedures involve reading-off and measuring from graduated and numerically marked measuring devices and almost invariably involve fractional dimensions (for instance, fractions of an inch) that have to be applied cumulatively. Reading or arithmetic mistakes are easily made, and such errors are likely to have rather grave consequences, since these errors are usually cumulative. As it is often customary in such building construction work that relatively unskilled persons are employed therefor and because it is not uncommon that this work is performed by more or less analphabetic people, the likelihood of the occurance of such errors is much increased. It will be appreciated that undue and often excessive costs are caused by such errors due to the need for rebuilding.

Some of these difficulties have been recognized in the art and various attempts to alleviate them have been employed, albeit with inadequate success. Layout, supervision, and inspection by appropriately skilled persons have been costly alternatives. Appropriate specialized alphanumerically marked gradations and markings on measuring tapes and rulers have also been applied, yet this has often caused confusion and errors due to the need to discern specific readings among a plurality of markings and among measuring scale gradations. Furthermore, as design information is customarily provided on building construction plans in terms of center distances for construction members, establishment of spacings between such members offers additional opportunities for errors to occur, while usually relatively coarse thickness tolerances for construction lumber add to the difficulties even further. The cumulative nature of any such errors naturally aggravates caused problems.

Among the measures disclosed in the art to alleviate such difficulties are, for instance, carpenter's lay-off tapes disclosed in U.S. Pat. Nos. DES. 259,706 and DES. 260,738 issued to Smith. Smith shows measuring tapes having conventional scales graduated in inches and fractions thereof, having appropriate numerical markings, and also being provided with blocked off areas at various repetitive center distances that correspond to standardized stud spacings employed in building construction. Center distances are alphanumerically marked.

U.S. Pat. No. 4,301,596 to Sedlock discloses a stud tape measure that has two conventional scales, wherein, at the beginning end of the tape, the first scale starts at zero inches and the second scale starts with a dimension corresponding to one half the thickness of a respective stud. Alphanumeric markings indicate repetitive centers at standardized distances upon one scale and stud locations (and widths) are indicated by bold graduations and alphanumeric markings on the other scale.

U.S. Pat. No. 4,351,113 issued to Eggertsen et al discloses an adhesively backed disposable measuring tape having customary scales with numerical markings.

German Patent Application Publication DE 3529958A1by Karlsberg discloses an adhesive tape measure that is reinforced and that is imprinted with measuring scales which may include signs and symbols.

The adhesive template tape according to principles of the present invention is intended to obviate the hereinabove indicated difficulties. Accordingly, a primary object of the invention is the provision of an adhesive template tape including longitudinally equidistantly spaced, visually contrasting fields of identical longitudinal extents for laying out and establishing of building construction member locations without a need for reading of alphanumeric symbols and scales, and without the need for calculations, however simple. Thus the template tape of the invention expressly avoids scale gradations and alphanumeric markings.

SUMMARY OF THE INVENTION

In accordance with principles of the present invention, an adhesive template tape, having an adhesive backing, is provided with longitudinally equidistantly spaced, visually contrasting fields corresponding to standardized spacings, locations, and thickness sizes of building construction members. In use, the template tape is adhesively affixed to and along surfaces of construction members upon which other construction members are to be erected. Prior to the template's adhesion, a field (of the template) is aligned upon or with a location of or for a reference construction member. Thereafter, construction members are simply aligned with and affixed upon fields marked on the template. The template may remain in place after construction is finished. It will be appreciated that this essentially removes any element of confusion and that errors are minimized, if not entirely avoided.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

FIG. 2 is a schematic surface view of a fragment of an adhesive template tape as depicted in FIG. 1 including alignment assist means in accordance with principles of the present invention; and, FIG. 4 is a schematic surface view of a fragment of an adhesive template tape as depicted in FIG. 2 including alignment assist means in accordance with principles of the invention.

DESCRIPTION OF THE PREFERRED EMBODIMENTS

Figure 1:
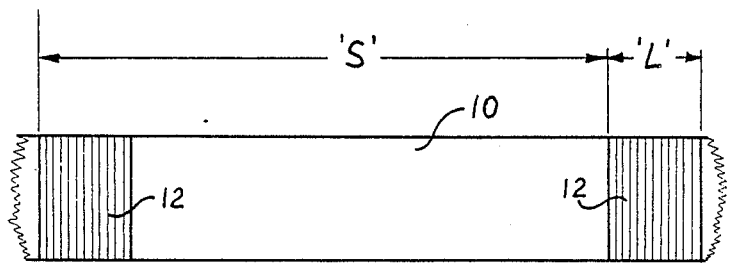
FIG. 1 is a schematic surface view of a fragment of an adhesive template tape according to principles of the invention.

Referring now to FIG. 1, an obverse surface 10 of an adhesive template tape is shown marked with a plurality of identical, visually contrasting fields 12. The reverse surface of the template tape is provided with an adhesive backing. Visually contrasting fields 12 are substantially of rectiliner shape and are equidistantly spaced longitudially along the adhesive template tape at spacings 'S'.

The longitudinal extent 'L' of each field 12 corresponds to a standardized thickness of building construction members. For instance, studs in wall framing construction customarily are of 2×4 or 4×4 nominal lumber sizes that have actual thicknesses of 1 ½ or 3 ½ inches, respectively. In this case, longitudinal extents 'L' are correspondingly 1 ½ or 3 ½ inches repectively. Spacing 'S' corresponds to a standardized spacing between building construction members. For instance, customarily employed spacings between studs in wall framing construction are 12, 16, or 24 inches. Fields 12 are preferably colored in a contrasting color such as red, while the areas between fields 12 are left unmarked. However, any other contrasting marking combination works equal well.

In an adhesive template tape 10 that is particularly suited for locating and spacing of construction siding members, for example, spacing 's' corresponds to a standardized spacing between successive siding members, while longitudinal extent 'l' of each field can be reduced to a clearly discernable line width. Alternately in this latter respect, longitudinal extent 'l' of each field 12 can-correspong to a standardized overlap width of siding members. For instance, spacing 's' can be 3, 4, or 5 inches, which distances correspond to a majority of standardized spacings customarily employed for siding members when inch sizes are utilized in building construction.

In use, an appropriate length of a suitable marked adhesive template tape, as hereinabove described, is cut or torn off a roll of tape or otherwise taken from a tape dispenser, is linearly extended, and is adhesively affixed to and along surfaces of construction members upon which other construction members are to be erected. Prior to the template's adhesion, an appropriate field 12 is aligned upon or with a location of or for a reference construction member. Thereafter, the other construction members are simply visually aligned with and affixed upon fields 12. The adhesive template tape may remain in place after construction is accomplished. It will be appreciated that the use of the adhesive template tape is extraordinarily simple, and that chances for errors or confusion are minimized. By use of the adhesive template tape, reading of tape measures or rulers, calculations of measurements, marking of construction members, etc. are largely avoided.

Figure 2:
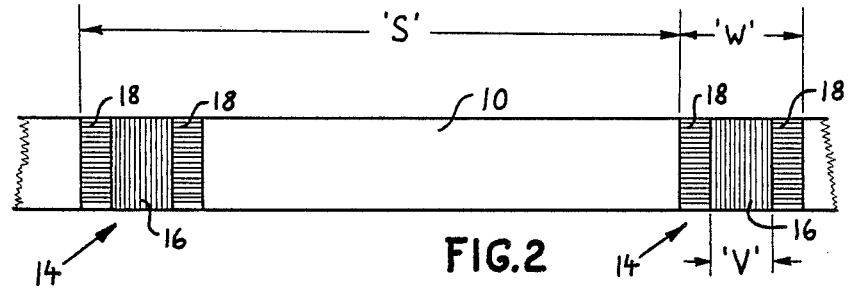
FIG. 2 is a schematic surface view of a fragement of another adhesive template tape of the invention.

Referring now to FIG. 2, an obverse surface 10 of an adhesive template tape is shown marked with a plurality of identical, visually contrasting compound fields 14, each compound field 14 comprising a center field 16 and two identical side fields 18, each side field 18 being disposed along a transverse boundary of center field 16. The reverse surface of the template tape is provided with an adhesive backing. Fields 14 and 16 are of substantially rectilinear shape. Compund fields 14 are equidistantly spaced longitudinally along the adhesive template tape at spacings 'S'. Mutually visually contrasting markings are provided for the areas of center field 16 and side fields 18, and visual contrat is also provided between each of the plurality of compound fields 14 and the unmarked regions therebetween.

The longitudinal extent 'W' of each compound field 14 corresponds to a first standardized thickness of building construction members, for instance 3 ½ inches, and the longitudinal extent 'V' corresponds to a second standardized thickness of building construction members, for instance 1 ½ inches. Spacings 'S' correspond to a standardized spacing between building construction members; for instance, 12, 16 or 24 inches.

The use of the adhesive template tape shown in FIG. 2 is substantially the same as described in conjunction with FIG. 1, except that the compound field 14 in FIG. 2 facilitates its employment not only for one particular thickness size of construction members, but also alternately for another thickness, thusly providing a dual purpose utility. For example, as indicated above, center field 16 is used to align thereupon 2×4 lumber and, alternately, the entire compound field 14 is used to align thereupon 4×4 lumber. Visual contrast is for example provided by a different color in center field 16 from the color in side fields 18, a preferred choice being red for the former and blue for the latter. However, any other contrasting color or other marking combinations work equally well.

Figure 3:
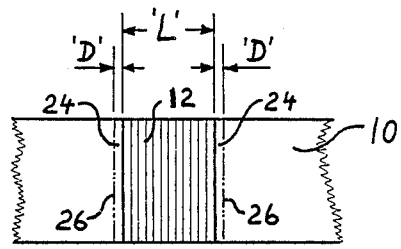

In order to further assist alignment of construction members upon fields 12, aligment assist means 24 are provided in form of further visually constrasting markings disposed along transverse boundaries of fields 12, as shown in FIG. 3. Alignment assist means 24 extend beyond tranverse boundaries of fields 12 by a small constant distance 'D', for instance about one eighth to one quarter of an inch. When construction members are being aligned upon fields 12, obstruction of field 12 (including obstruction of its boundaries) can result, since the longitudinal extent 'L' of field 12 equals the nominal actual thickness of the construction members. Lumber thicknesses are subject to relatively coarse tolerances and, consequently, particularly an oversize construction member placed over a field 12 during alignment therewith can cause complete obstruction of field 12 while possibly not being properly centered thereover. Alignment assist means 24 avoids alignment difficulties in such situations and facilitates substantially correct centering of construction members upon fields 12 by being visible at all times in part along its outer boundaries. Alignment assist means 24 is preferably formed by a transverse marking 26, as indicated in FIG. 3 and it may include further visually constrasting markings upon the area within its distance 'D', for example color or geometric patterns.

Figure 4:
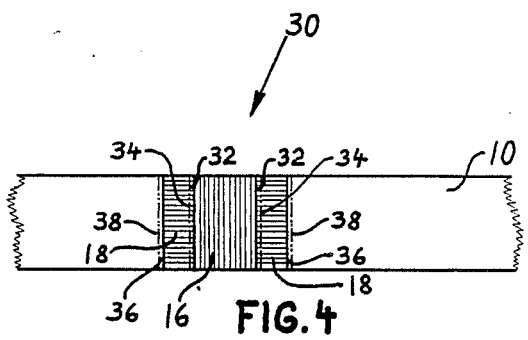

Referring now to FIG. 4, a compound field 30 is shown that is similar to compund field 14 of FIG. 2, and that also includes a center field 16 and side fields 18. A plurality of compund field 30 is provided upon obverse surface 10 of an adhesive template tape, as hereinbefore described in conjunction with FIG. 2, except that each compound field 30 further includes first alignment assist means 32 having transverse markings 34, similarly as hereinbefore described in conjunction with FIG. 3, as well as second alignment assist means 36 having transverse markings 38. The purpose of first and second alignment assist means 34 and 36 is the same as described hereinabove in conjunction with FIG. 3; i.e. to assist and facilitate proper centering of construction members upon center field 16 or, alternately, upon compound field 30. Thus compound field 30 depicted in FIG. 4 provides the dual purpose utility offered by the compound fields 14 shown in FIG. 2 with the addition of the alignment assist means indicated in FIG. 3.

It will be understood that, whereas the preceding description has included examples of inch-dimensions for standardized sizes, the invention is equally applicable to standardized sizes in metric dimensions, as employed in many parts of the world. Also, the invention is not intended to be limited to uses in wall framing and lumber materials, but is applicable equally well to other aspects of building construction wherein pluralities of equally spaced construction members need to be aligned. For instance, the adhesive template tape of the invention is also advantageously employable for alignment and erection of rafters, floor and ceiling joists, etc.

The adhesive template tape of the invention has preferably a relatively small thickness, as used for adhesive tapes in packaging, and it is preferably of a material that does not excessively stretch elastically along its length. The tape may be reinforced. Different widths of the template tape will apply to different uses, although no specific requirements exist. However, it will be appreciated that a tape width in the range between about ⅜"–1" in width is preferred for use in erection of studs in wall framing. It will be understood that tape rolls and/or dispensers therefor are preferably appropriately marked with identification markings to indicate specific standardized field sizes and spacings to which a particular tape is applicable.

While the invention has been particularly shown and described with reference to preferred embodiments thereof, it will be understood by those skilled in the art that various changes and modifications in form and details may be made therein without departing from the spirit and scope of the invention.

The embodiments of the invention in which an exclusive property or privilege is claimed are defined as follows:

1. An adhesive template tape comprising:
   an obverse surface;
   a reverse surface provided with a self-adhesive layer disposed thereupon;
   a plurality of marked fields upon and in said obverse surface, said marked fields being equidistantly spaced longitudinally along said obverse surface, said marked fields having substantially identical longitudinal extents; and
   spaces separating said marked fields longitudinally;
   said marked fields being provided with highcontrast marking to effect distinct visual contrast relative to said spaces, wherein said self-adhesive layer provides for adhesion of the adhesive template tape to ordinary building construction materials, wherein said marked fields in combination with said spaces serve as visual templates for establishing proper locations and spacing of construction members during erection thereof along and on other construction members when the adhesive template tape is adhesively affixed thereto, so that superpositioning and substantially aligning said construction members upon the adhesive template tape in substantial visual registration correspondence with the markings in said marked fields established proper locations for attachment of said construction member to said other construction members;
   wherein said marked fields are compound fields, each said compound field comprising a center field and two substantially identical side fields, each of said substantially identical side fields being disposed along and adjoining a transverse boundary of said center field, said center field being provided with visually constrasting markings relative to said side fields, said center fields extending longitudinally by substantially identical lengths, said compound fields providing a dual purpose utility for aligning of said construction members having a thickness size corresponding to the longitudinal extent of said compound field or, alternately, a thickness size corresponding to the longitudinal extent of said center field.

2. The adhesive template tape according to claim 1, wherein said center field is marked in one color and said side fields are marked in another color.

3. The adhesive template tape according to claim 1, wherein said compound fields and said center fields further comprise alignment assist means to aid in alignment of said construction members, said alignment assist means being disposed along and adjoining transverse boundaries of said compound fields and of said center fields, said alignment assist means being provided in form of further visually contrasting markings extending for a constant distance from said transverse boundaries, said constant distance being preferably in the range of about one eigth to one quarter of an inch.

4. The adhesive template tape according to claim 1, wherein said identical longitudinal extents of said compound fields correspond to a first standardized thickness dimension of said construction members, wherein said identical lengths of said center fields correspond to a second standardized thickness dimension of said construction members, said compound fields being equidistantly spaced by standardized distance spacings between said construction members.

5. The adhesive template tape according to claim 4, wherein said first standardized thickness dimension is 3 ½ inches, and wherein said second standardized thickness dimension is 1 ½ inches.

6. The adhesive template tape according to claim 4, wherein said standardized distance spacings are 12 inches.

7. The adhesive template tape according to claim 4, wherein said standardized distance spacings are 16 inches.

8. The adhesive template tape according to claim 4, wherein said standardized distance spacings are 24 inches.

9. The adhesive template tape according to claim 1, wherein said substantially identical longitudinal extents correspond to standardized thickness dimensions of said construction members, said marked field being substantially equidistantly spaced by standardized distance spacings between said construction members.

10. The adhesive template tape according to claim 9, wherein said standardized thickness dimension is 1 ½ inches.

11. The adhesive template tape according to claim 9, wherein said standardized thickness dimension is 3 ½ inches.

12. The adhesive template tape according to claim 9, wherein said standardized distance spacings are 12 inches.

13. The adhesive template tape according to claim 9, wherein said standardized distance spacings are 16 inches.

14. The adhesive template tape according to claim 9, wherein said standardized distance spacings are 24 inches.

15. The adhesive template tape according to claim 9, wherein said marked fields are equidistantly spaced by three inches.

16. The adhesive template tape according to claim 9, wherein said marked fields are equidistantly spaced by four inches.

17. The adhesive template tape according to claim 9, wherein said marked fields are equidistantly spaced by five inches.

18. An adhesive template tape comprising:
an observe surface;
a reverse surface provided with a self-adhesive layer disposed thereupon;
a plurality of marked fields upon and in said obverse surface, said marked fields being equidistantly spaced longitudinally along said obverse surface, said marked fields having substantially identical longitudinal extents; and
spaces separating said marked fields longitudinally;
said marked fields being provided with highcontrast marking to effect distinct visual contrast relative to said spaces, wherein said self-adhesive layer provides for adhesion of the adhesive template tape to ordinary building construction materials, wherein said marked fields in combination with said spaces serve as visual templates for establishing proper locations and spacing of construction members during erection thereof along and on other construction members when the adhesive template tape is adhesively affixed thereto, so that superpositioning and substntially aligning said construction members upon the adhesive template tape in substantial visual registration correpondence with the markings in said marked fields establishes proper locations for attachment of said construction members to said other construction members;
wherein said marked fields further comprise alignment assist means to aid in alignment of said construction members, said alignment assist means being disposed along and adjoining transverse boundaries of said marked fields, said alignment assist means being provided in form of further visually contrasting markings extending for a substantially constant distance from said transverse boundaries, said substantially constant distance being preferably in the range of about one eighth to one quarter of an inch.

19. The adhesive template tape according to claim 18, wherein said substantially identical longitudinal extents correspond to standardized thickness dimensions of said construction members, said marked fields being substantially equidistantly spaced by standardized distance spacings between said construction members.

20. The adhesive template tape according to claim 19, wherein said standardized thickness dimension is 1 ½ inches.

21. The adhesive template tape according to claim 19, wherein said standardized thickness dimension is 3 ½ inches.

22. The adhesive template tape according to claim 19, wherein said standardized distance spacings are 12 inches.

23. The adhesive template tape according to claim 19, wherein said standardized distance spacings are 16 inches.

24. The adhesive template tape according to claim 19, wherein said standardized distance spacings are 24 inches.

25. The adhesive template tape according to claim 19, wherein said marked fields are equidistantly spaced by three inches.

26. The adhesive template tape according to claim 19, wherein said marked fields are equidistantly spaced by four inches.

27. The adhesive template tape according to claim 19, wherein said marked fields are equidistantly spaced by five inches.

* * * * *